May 14, 1957
M. J. LIESER
2,792,019
PISTON ACTUATED SUPPLY AND EXHAUST VALVE
Filed Feb. 23, 1954
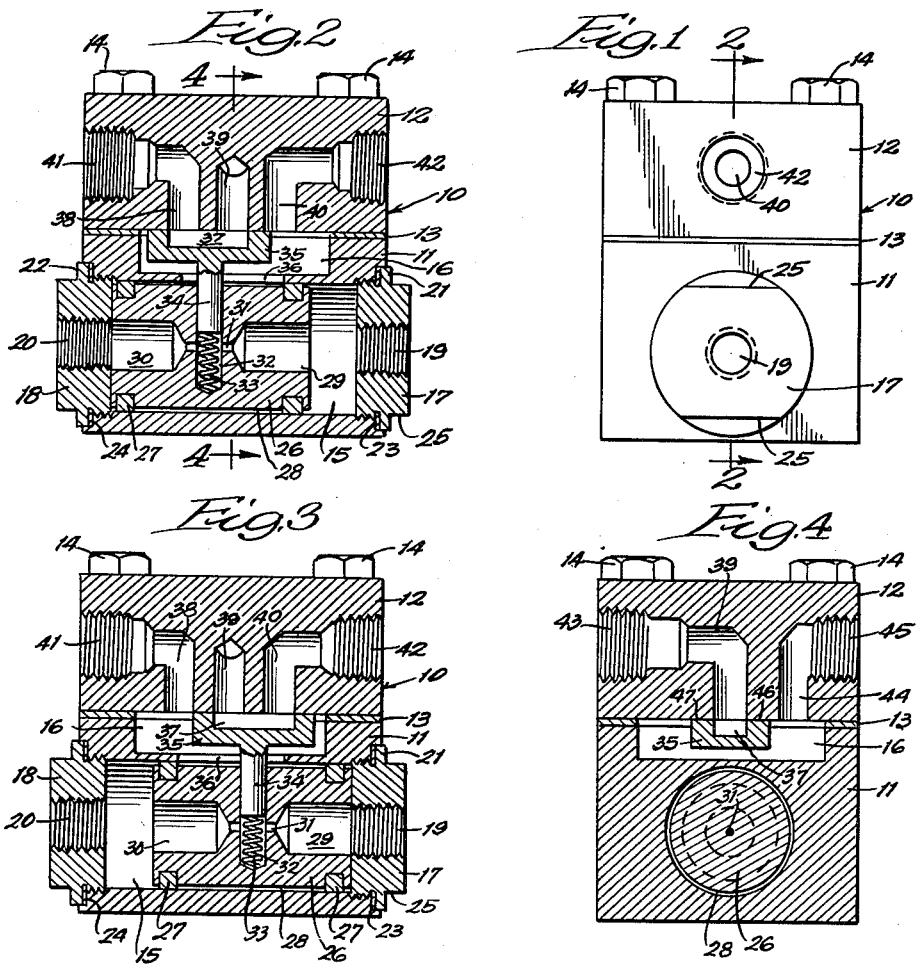
INVENTOR:
Mathias J. Lieser,
BY
Dawson, Tilton & Graham,
ATTORNEYS.

United States Patent Office 2,792,019
Patented May 14, 1957

2,792,019

PISTON ACTUATED SUPPLY AND EXHAUST VALVE

Mathias J. Lieser, Chicago, Ill., assignor to Mead Specialties Company, Inc., Chicago, Ill., a corporation of Illinois Application February 23, 1954, Serial No. 411,660

2 Claims. (Cl. 137—620)

This invention relates to a valve structure, and more particularly to a slidable valve wherein controlled flow of fluid through a pair of ports is provided. The valve structure has numerous applications and may be used wherever the flow of fluid through spaced ports must be controlled, as for example in pneumatically operated equipment in which air under pressure flows first through one pair of passages, communication being established by the valve, and thereafter through a separate pair of passages, communication alternately being established by the same valve.

An object of the invention is to provide a reciprocatory valve operative to alternately close a pair of spaced ports and while closing one to establish a fluid flow path through the other. Another object of the invention is to provide a valve structure as described above wherein the reciprocatory motion of the valve is provided by a piston operatively arranged therewith and which is actuated by fluid pressure. Another object is in providing a valve structure wherein a piston reciprocated within a cylinder by the alternate application of fluid pressure to the opposite ends thereof is coupled to a slidable valve operative upon reciprocation thereof to provide controlled flow of fluid through a pair of ports. Still another object is to provide a four-way valve wherein the controlled flow of fluid through a pair of spaced ports is provided by a piston-actuated reciprocatory valve member, the piston being in slidable and sealing relation with the walls of a cylinder and the piston having a restricted flow passage therethrough whereby a limited volume of fluid under pressure applied at one end of the piston to actuate the same is bled to the opposite side thereof.

A further object is in providing a valve structure in accordance with the above which is economical yet reliable in operation, the cost of the structure being reduced by making unnecessary the need for close tolerances between the piston and cylinder through the use of seals in combination with a fluid bleed passage through the piston. Additional objects and advantages will appear as the specification proceeds.

An embodiment of the invention is illustrated in the accompanying drawing, in which:

Figure 1 is an end view in elevation of a valve structure embodying the invention; Fig. 2 is a longitudinal sectional view taken on the line 2—2 of Fig. 1; Fig. 3 is a longitudinal sectional view similar to that of Fig. 2 but showing the valve in another position; and Fig. 4 is a transverse sectional view taken on the line 4—4 of Fig. 2.

The structure illustrated comprises a casing or valve body indicated in whole by the numeral 10, and which is formed by a lower casing portion 11 and an upper casing portion 12 separated by a sealing gasket 13 and held together by cap screws 14. The lower casing portion 11 is provided with a cylinder 15 and a valve chamber 16. The cylinder 15 extends from one end to the other of the casing portion 11 and the ends of the cylinder are closed by plugs 17 and 18 each of which is threaded and is threadedly received within the casing portion 11. Each of the plugs 17 and 18 is provided respectively with a threaded passage 19 and 20 therethrough, each adapted to receive a fitting and suitable structure for selectively releasing air or otherwise reducing the pressure at either end of the piston. Each of the plugs is also equipped with a laterally-extending flange 21 and 22 respectively that bears upon gasket members 23 and 24 to provide a fluid-tight seal with the casing portion 11. As is seen best in Fig. 1, each of the plugs is also equipped with flattened portions 25 so that a wrench can be readily received thereon for tightening the plugs.

A piston 26 that is preferably cylindrical is mounted for reciprocatory movement within the cylinder 15 and is in sealing engagement therewith through the medium of the packing members or seals 27 provided at each end of the cylinder. As is seen best in Figs. 2 and 3, a considerable spacing 28 is provided between the walls of the cylinder and piston and the seal members 27 are operative to seal this space so that there is no loss of fluid between the cylinder and piston.

The piston 26 is provided at one end with an enlarged bore 29 that is substantially comparable in diameter to the diameter of the port or passage 19, while at the opposite end a bore 30 is provided that is similarly of substantially the same diameter as that of the port or passage 20. The bores 29 and 30 terminate at spaced points from the center of the piston 26 and are in open communication with each other through a restricted flow passage 31. The piston 26 is also provided with a transverse bore 32 therein that provides a seat for a spring 33 that bears upwardly against a stem 34 provided by a valve 35 slidably mounted within the valve chamber 16. It is clear from Figs. 2 and 3 that an elongated slot 36 is provided within the casing section 11 and establishes communication between the cylinder 15 and valve chamber 16 and permits reciprocatory movement in a longitudinal direction of the valve stem 34.

The valve 35 is generally rectangular and is provided with a recess or channel 37 therein that is of such length that open communication is provided between end passage 38 and intermediate passage 39 when the valve 35 is in the position shown in Fig. 2, while when the valve is in the position illustrated in Fig. 3, open communication is provided by the recess 37 through the intermediate passage 39 and the end passage 40.

The passage 38 may be generally L-shaped and terminates at its outer end in a threaded opening 41 adapted to receive a fitting to connect the flow passage for communication with a fluid flow conduit. Similarly, the outer end of passage 40 is provided with threads 42 for receiving the fitting of a fluid flow conduit. As is seen in Fig. 4, intermediate passage 39 may also be L-shaped and terminates in a threaded end portion 43 that can receive the fitting of a fluid flow conduit.

As is seen best in Fig. 4, a fourth L-shaped flow passage 44 is provided and at its outer end is threaded as at 45 for receiving the fitting of a fluid flow conduit. The inner end of the passage 44 is in open communication with the chamber 16 and serves as an inlet for supply fluid under pressure thereto.

In operation of the structure, and starting with the position of the piston 26 and valve 35 that is shown in Fig. 2, the passages 38 and 39 are in open communication with each other through the recess 37 provided by the valve 35 and the piston 26 is at the left end of the cylinder 15. It is apparent that fluid is free to flow through the passages 38 and 39 and through the flow conduits that may be connected thereto to bring about a phase in the operation of the pneumatic equipment or other equipment with which the valve is associated. At the same time, inlet passage 44, through chamber 16, is in open communication with passage 40. Thus while pressure fluid is being supplied to passage 40, passage 38 is being exhausted through recess 37 and passage 39.

If pressure is reduced at the port 19, the piston 26 will be driven toward the right and eventually to the position shown in Fig. 3 wherein the piston substantially abuts the plug or cylinder closure 17. This phase of the reciprocatory movement causes the valve 35 to be moved to the extreme right position shown in Fig. 3, and communication is thereby provided between the exhaust passage 39 and end passage 40 through the recess 37 of the valve whereby passage 40 is exhausted. Air or other pressure fluid is at the same time free to flow from the passage 44 to passage 38 and this will bring about another phase in the operation of the equipment associated with the valve structure.

The coil spring 33 biases the valve 35 upwardly and against the flat face 46 of the upper casing portion 12 and a substantially fluid-tight seal is provided between the valve face 47 and face 46 of the casing section. Thus while communication between the intermediate or exhaust passage and one end passage or port of the valve structure is provided, the other port or passage is in communication with the inlet passage 44 but not with the exhaust passage, since it is sealed from communication with the valve channel or recess 37.

While the coil spring 32 pushes the valve 35 upwardly and into sealing engagement with the valve seat or face 46 of the casing section 12, pressure fluid also builds up in the lower portion of the bore 32 about the spring 33 due to the presence of fluid under pressure within the cylinder 15 and passages 29, 30 and 31. The passage 31 communicates with the bore 32 and thereby a pressure is developed beneath the valve stem 34 and such pressure in combination with the force of the spring 33 drives the valve 35 into substantially sealing engagement with the valve face 46.

The piston 26 is reciprocated within the cylinder 15 by the alternate release of pressure fluid at the opposite ends of the cylinder through the ports or passages 19 and 20. If, for example, pressure fluid is present at the port 20 when the piston 26 is in position shown in Fig. 2, such pressure fluid will also be present at the opposite end of the piston or at the port 19. Then, if the pressure at the port 19 is released, the excess of pressure at port 20 will cause the piston to move to the right or toward port 19. Thereafter, if a reduction in pressure takes place at port 20, the piston will move toward that port.

It is unnecessary to machine or otherwise finish the walls of the cylinder 15 and piston 26 to close tolerance so that a metal-to-metal fluid seal between these members is provided. Rather than this, the walls of the piston 26 are spaced slightly from the cylinder walls, and seals 27 are provided to seal the piston to the cylinder. Thus, less stringent manufacturing tolerances need be provided and yet the seals or packing provide the requisite fluid-tight seal. The packing members or seals 27 may be formed of leather. The combination of the spring force and pressure of the fluid that urge the valve member 35 upwardly and into sealing engagement with the seat 46 is advantageous, for during the interval when pressure fluid is removed from one of the ports 19 or 20 and applied to the opposite port, as the first step in moving the piston 26 from one end of the cylinder to the other, there is a reduction in the upward force against the valve 35 and it is thereby permitted to slide more freely along the seat 46. On the other hand, when the valve is in either the extreme position shown in Fig. 2 or the position shown in Fig. 3, the upward force upon the valve 35 is maximum and there is little likelihood of escape or loss of the pressure fluid flowing between one of the end passages 38 or 40 and the intermediate passage 39.

The seals 27 about the piston 26 are slightly flexible and yieldable and preferably are formed of leather. Leather seals are particularly desirable for they offer a relatively low frictional resistance which, it will be appreciated, tends to restain movement of the piston 26. Since it is desirable to bring about movement of the piston upon a slight reduction in the pressure at an end thereof, it will be apparent that the frictional resistance provided by the seal members must be relatively low. Further, while the leather packing or sealing members 27 provide a fairly tight fluid seal, there is some small leakage of fluid between the seals and the walls of the cylinder. This leakage facilitates movement of the piston when there is a slight reduction in pressure adjacent an end of the piston.

While in the foregoing specification an embodiment of the invention has been set out in considerable detail for purposes of illustration, it will be apparent to those skilled in the art that considerable variation may be made in such details without departing from the spirit and principles of the invention.

I claim:

1. In a valve structure, a casing providing a cylinder equipped with end closures providing ports communicating with said cylinder, a piston mounted for reciprocatory movement within said cylinder and providing a longitudinally-extending flow passage therethrough equipped with a restricted central portion and communicating with opposite ends of said cylinder, flexible seal members carried by said piston adjacent the ends thereof for slidable sealing engagement with the walls of said cylinder and providing relatively low resistance to movement, said casing providing also a valve chamber, a valve slidably mounted within said chamber and being equipped with a valve stem, said piston having a transverse bore therein slidably receiving said valve stem and said cylinder having an elongated slot in a wall thereof through which said stem extends and is freely slidable, a plurality of flow ports provided by said casing and communicating with said valve chamber, said casing providing a valve seat about said ports, and a spring mounted within said transverse bore for biasing said valve against said seat, said restricted central portion of said passage through the piston communicating with said transverse bore beyond the free end of the valve stem, whereby a fluid pressure flowing through said passage is operative to urge said valve stem upwardly to bias said valve against said seat.

2. In a valve structure, a casing providing a cylinder equipped with end closures providing ports communicating with said cylinder, a piston mounted for reciprocatory movement within said cylinder and providing a longitudinally-extending flow passage therethrough equipped with a restricted central portion and communicating with opposite ends of said cylinder, leather seals interposed between said piston and the walls of said cylinder to provide a substantially fluid-tight seal therebetween and providing relatively low resistance to movement of said piston, said casing providing also a valve chamber, a valve slidably mounted within said chamber and being equipped with a valve stem, said piston having a transverse bore therein slidably receiving said valve stem and said cylinder having an elongated slot in a wall through which said stem extends and is freely slidable, said casing providing a plurality of flow ports communicating with said valve chamber and providing also a valve seat about said ports, and a spring mounted within said transverse bore for biasing said valve against said seat, said restricted central portion of said passage communicating with said transverse bore beyond the free end of the valve stem, whereby a fluid pressure flowing through said passage is operative to urge said valve stem upwardly to bias said valve against said seat.

References Cited in the file of this patent

UNITED STATES PATENTS

| | | | |
|---|---|---|---|
| Re. 1,985 | Stacy | June 6, | 1865 |
| 793,429 | Engberg | June 27, | 1905 |
| 1,335,953 | Babson | Apr. 16, | 1920 |
| 2,308,235 | Fields | Jan. 12, | 1943 |
| 2,616,449 | Maha | Nov. 4, | 1952 |